US009280283B2

(12) United States Patent
Gao et al.

(10) Patent No.: US 9,280,283 B2
(45) Date of Patent: Mar. 8, 2016

(54) CONTACTLESS GESTURE RECOGNITION WITH SENSOR HAVING ASYMMETRIC FIELD OF VIEW

(71) Applicant: BLACKBERRY LIMITED, Waterloo (CA)

(72) Inventors: Yu Gao, Waterloo (CA); Antanas Matthew Broga, Cambridge (CA); Priyadarshini Krishnaswamy, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 200 days.

(21) Appl. No.: 14/064,243

(22) Filed: Oct. 28, 2013

(65) Prior Publication Data

US 2015/0116273 A1    Apr. 30, 2015

(51) Int. Cl.
| G06F 3/01 | (2006.01) |
| G06F 3/042 | (2006.01) |
| G06F 3/0488 | (2013.01) |
| G01S 17/02 | (2006.01) |
| G01S 17/50 | (2006.01) |
| G01S 7/481 | (2006.01) |
| G01S 17/08 | (2006.01) |

(52) U.S. Cl.
CPC ........... *G06F 3/04883* (2013.01); *G01S 7/4816* (2013.01); *G01S 17/026* (2013.01); *G01S 17/08* (2013.01); *G01S 17/50* (2013.01); *G06F 3/017* (2013.01); *G06F 3/0421* (2013.01)

(58) Field of Classification Search
CPC ... G06F 3/0421; G06F 3/04883; G06F 3/017; G01S 17/08

USPC .................................................. 345/175
See application file for complete search history.

(56) References Cited

U.S. PATENT DOCUMENTS

| 2010/0238030 A1 | 9/2010 | Shafer et al. |
| 2010/0295773 A1 | 11/2010 | Alameh et al. |
| 2011/0188025 A1* | 8/2011 | Haas et al. .................. 356/4.07 |
| 2011/0248151 A1 | 10/2011 | Holcombe et al. |

(Continued)

FOREIGN PATENT DOCUMENTS

WO    2012065516    5/2012

OTHER PUBLICATIONS

EPO, Extended European Search Report relating to Application No. 14190760.0, dated Mar. 19, 2015.

(Continued)

*Primary Examiner* — Ariel Balaoing
(74) *Attorney, Agent, or Firm* — Rowand LLP

(57) ABSTRACT

Methods, devices and sensors for detecting a gesture are described. In an embodiment, a gesture sensor includes a time of flight sensor having a sensing element configured to generate an electrical signal responsive to received light. The time of flight sensor also includes a light source for emitting a burst of light. The sensing element has a sensing side for receiving light and a non-sensing side which is opposite the sensing side. The gesture sensor also includes one or more light inhibitors positioned relatively nearer the sensing side of the sensing element than the non-sensing side. The light inhibitors are asymmetric about a first center line of the sensing element. The first center line is located midway between first and second sides of the sensing element. The gesture sensor further includes a processor coupled to the time of flight sensor configured to detect a gesture.

20 Claims, 9 Drawing Sheets

(56) References Cited

U.S. PATENT DOCUMENTS

| | | |
|---|---|---|
| 2011/0289456 A1 | 11/2011 | Reville et al. |
| 2011/0303832 A1 | 12/2011 | Wernersson et al. |
| 2011/0310005 A1 | 12/2011 | Chen et al. |
| 2012/0287044 A1 | 11/2012 | Bell et al. |
| 2013/0153754 A1 | 6/2013 | Drader et al. |
| 2013/0162778 A1 | 6/2013 | Kurokawa |

OTHER PUBLICATIONS

Drader et al.: "EE Times—Time-of-flight measurement open up user-interaction scenarios", EE Times, Jul. 5, 2013, XP055172339.

Anonymous: STMicroelectronics Proximity Sensor Solves Smartphone Hang-ups, STMicroelectronics, Feb. 25, 2013, XP055172326.

Global Sources EE Times Asia: "Photodiode addition lets LCD detect hand gesture", posted on Dec. 23, 2009.

EE Times: "Infineon launches 3-D sensor for gesture recognition" dated May 29, 2013.

JDSU: "Optical 3D Gesture Recognition and JDSU" dated May 12, 2011.

Texas Instruments: "Gesture Recognition: Enabling natural interactions with electronics" dated Apr. 2012.

* cited by examiner

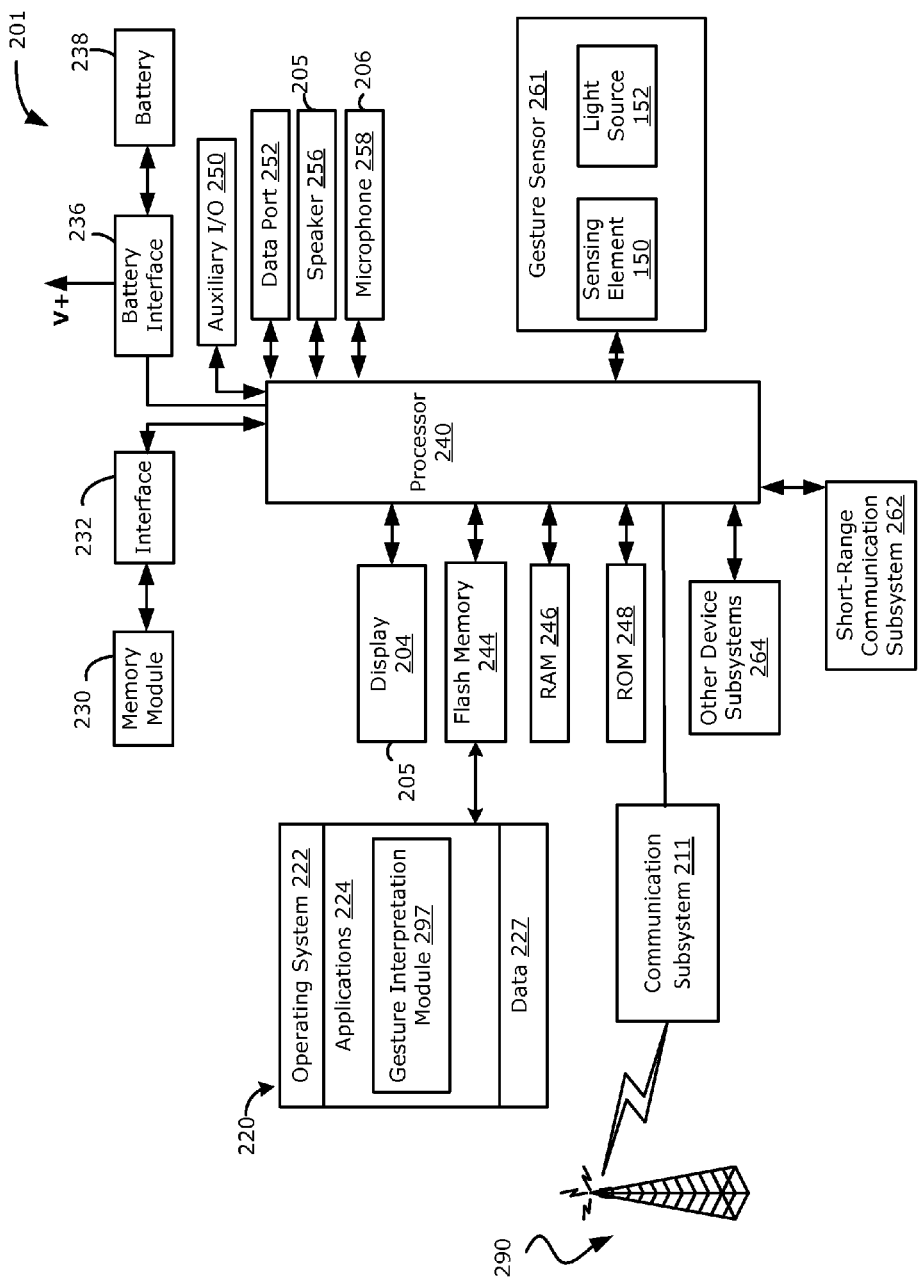

CONTACTLESS GESTURE RECOGNITION WITH SENSOR HAVING ASYMMETRIC FIELD OF VIEW

TECHNICAL FIELD

The present disclosure relates to input modules for electronic devices and, more particularly, to methods, sensors and devices which recognize a contactless gesture.

BACKGROUND

Electronic devices are often equipped with one or more input devices for receiving instructions, commands, and other input from users of such electronic devices. For example, electronic devices often have one or more depressible buttons or keys which may be activated by a user to input instructions, commands, and other input to the electronic device. Such input devices may include a track pad, trackball, or touch pad, which may be used for providing navigational input to the electronic device. Recently, touchscreen display screens have become commonplace. Touchscreen displays are displays which have a touch-sensitive overlay for receiving input.

While input devices for electronic devices are available in many different shapes and sizes, such input devices often require a user to engage a specific portion of an electronic device (such as a button) through direct contact with that portion (e.g. by pressing a button). Such contact may soil the electronic device. For example, touchscreen displays sometimes become obscured from fingerprints which are left on the display following user contact. In addition to attracting dirt and debris, repeated contact on mechanically activated input devices may result in failure of such input devices over time (e.g. repeated pressing of a button may result in failure of that button).

Contactless input mechanisms have been proposed but techniques for interpreting contactless gestures are typically resource or hardware intensive, requiring a large amount of processing capabilities or extensive hardware components.

BRIEF DESCRIPTION OF THE DRAWINGS

Reference will now be made, by way of example, to the accompanying drawings which show example embodiments of the present application and in which:

FIG. 13 is a block diagram illustrating components of an example electronic device in accordance with example embodiments of the present disclosure.

Like reference numerals are used in the drawings to denote like elements and features.

DETAILED DESCRIPTION OF EXAMPLE EMBODIMENTS

Figure 1:
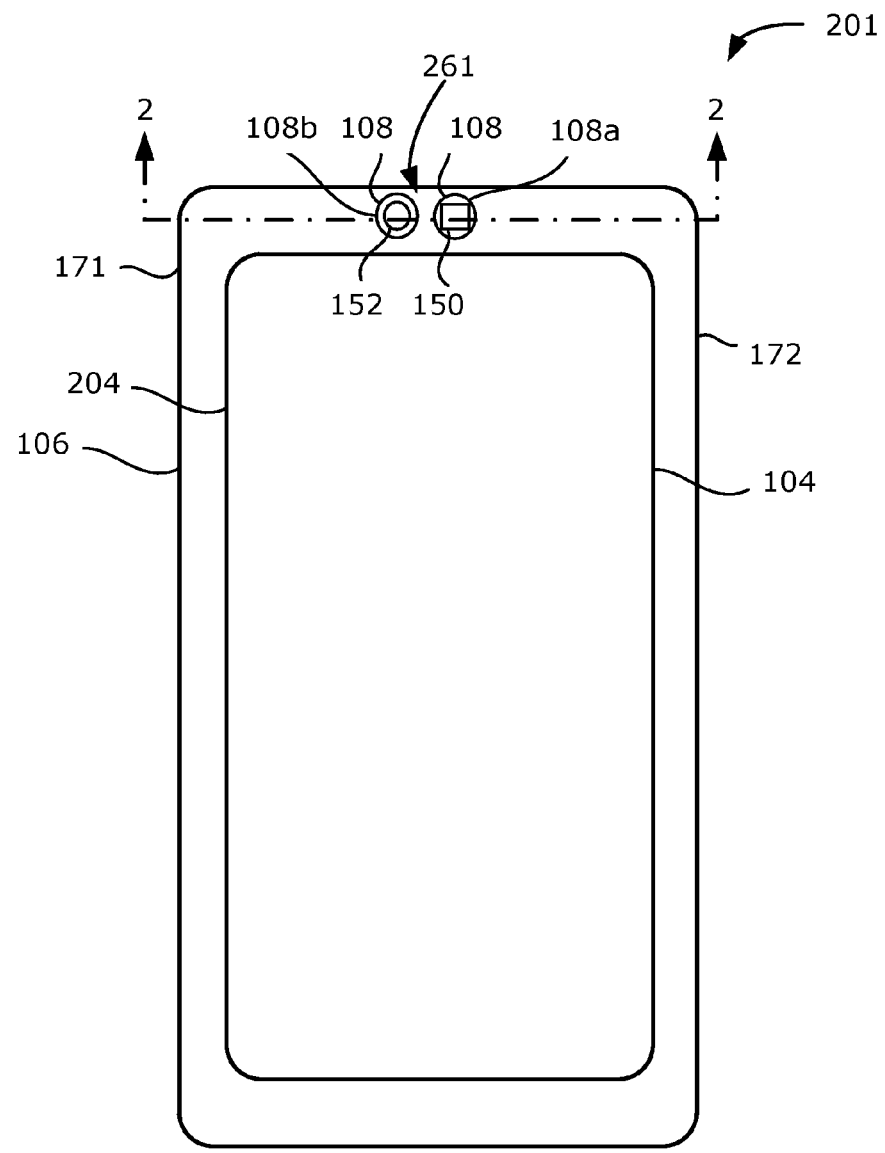
FIG. 1 is a top view of an example electronic device having a gesture sensor in accordance with example embodiments of the present disclosure.

In one aspect, the present disclosure describes a gesture sensor. The gesture sensor includes a time of flight sensor having a sensing element configured to generate an electrical signal responsive to received light. The time of flight sensor also includes a light source for emitting a burst of light. The sensing element has a sensing side for receiving light and a non-sensing side which is opposite the sensing side. The gesture sensor also includes one or more light inhibitors positioned relatively nearer the sensing side of the sensing element than the non-sensing side. The light inhibitors are asymmetric about a first center line of the sensing element. The first center line is located midway between first and second sides of the sensing element. The gesture sensor further includes a processor coupled to the time of flight sensor. The processor is configured to determine that a swipe gesture in a first direction has been performed when the electrical signal generated by the sensing element represents one or more predetermined characteristics associated with a swipe gesture in the first direction. The swipe gesture in the first direction is characterized by movement of a subject from the first side of the sensing element towards the second side of the sensing element. The one or more predetermined characteristics associated with a portion of the light inhibitors located relatively closer to the first side of the sensing element than the second side of the sensing element.

In yet another aspect, the present disclosure describes an electronic device. The electronic device includes a processor and a gesture sensor. The gesture sensor includes a time of flight sensor having a sensing element configured to generate an electrical signal responsive to received light. The time of flight sensor also includes a light source for emitting a burst of light. The sensing element has a sensing side for receiving light and a non-sensing side which is opposite the sensing side. The gesture sensor also includes one or more light inhibitors positioned relatively nearer the sensing side of the sensing element than the non-sensing side. The light inhibitors are asymmetric about a first center line of the sensing element. The first center line is located midway between first and second sides of the sensing element. The processor is configured to determine that a swipe gesture in a first direction has been performed when the electrical signal generated by the sensing element represents one or more predetermined characteristics associated with a swipe gesture in the first direction. The swipe gesture in the first direction is characterized by movement of a subject from the first side of the sensing element towards the second side of the sensing element. The one or more predetermined characteristics associated with a portion of the light inhibitors located relatively closer to the first side of the sensing element than the second side of the sensing element.

In yet another aspect, the present disclosure describes a method of detecting a gesture. The method may be performed on a processor associated with an electronic device. The electronic device including a gesture sensor. The gesture sensor includes a time of flight sensor having a sensing element configured to generate an electrical signal responsive to received light. The time of flight sensor also includes a light source for emitting a burst of light. The sensing element has a sensing side for receiving light and a non-sensing side which is opposite the sensing side. The gesture sensor also includes one or more light inhibitors positioned relatively nearer the sensing side of the sensing element than the non-sensing side. The light inhibitors are asymmetric about a first center line of the sensing element. The first center line is located midway between first and second sides of the sensing element. The method includes determining that a swipe gesture in a first direction has been performed when the electrical signal generated by the sensing element represents one or more predetermined characteristics associated with a swipe gesture in the first direction. The swipe gesture in the first direction is characterized by movement of a subject from the first side of the sensing element towards the second side of the sensing element. The one or more predetermined characteristics associated with a portion of the light inhibitors located relatively closer to the first side of the sensing element than the second side of the sensing element.

Other example embodiments of the present disclosure will be apparent to those of ordinary skill in the art from a review of the following detailed descriptions in conjunction with the drawings.

Example Electronic Device with Gesture Sensor

Figure 2:
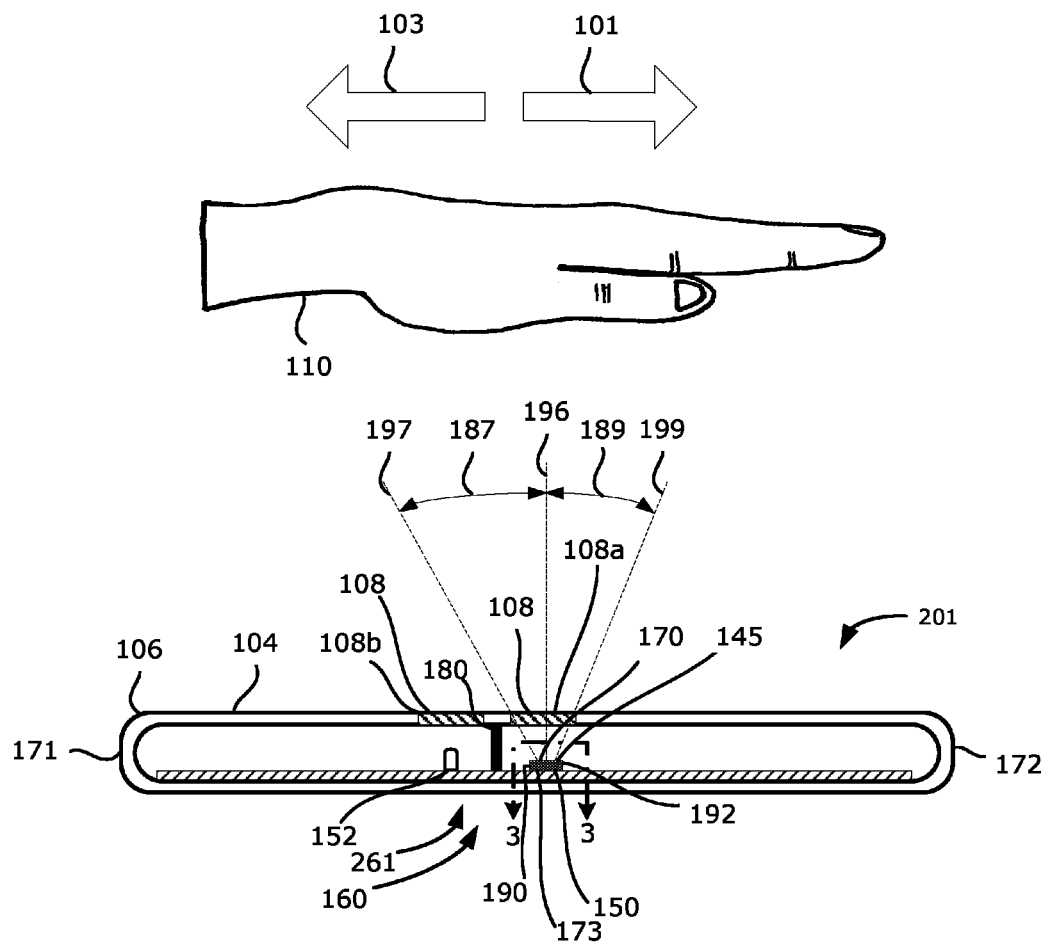
FIG. 2 is a cross-sectional view of the example electronic device of FIG. 1 taken along line 2-2 of FIG. 1.

Reference will now be made to FIGS. 1 and 2 which illustrate an example electronic device 201 which includes a gesture sensor 261. A top view of the electronic device 201 is illustrated in FIG. 1. FIG. 2 illustrates a cross sectional view of the electronic device 201, taken along line 2-2 of FIG. 1.

The gesture sensor 261 is configured to allow a user of the electronic device 201 to input one or more instructions, commands, or other input to the electronic device 201. More particularly, the gesture sensor 261 may be configured to receive contactless input from a user of the electronic device 201. Contactless input, which may also be referred to as touch-less input, is input which does not require a user to physically touch the electronic device 201. For example, the contactless input may be provided by a user to the electronic device 201 through movement of a hand 110 (FIG. 2), or other object in a specific region near the electronic device 201.

More particularly, the contactless input may be provided by a user by moving a hand 110 (FIG. 2) or other object within a sensing area associated with the gesture sensor 261. The sensing area may be described as a region of space near the electronic device 201 in which the electronic device 201 is able to monitor movements of objects. More particularly, the sensing area may be described, in one example, as a region of space in which the gesture sensor 261 is able to detect object movement, such as the movement of a hand.

The gesture sensor 261, in at least some embodiments, allows the electronic device 201 to identify an air gesture performed within the sensing area of the gesture sensor 261. An air gesture is contactless input having one or more predetermined characteristics. For example, a swipe gesture may be characterized by movement of an object (such as a hand 110 (FIG. 2)) in a direction that is substantially parallel to the electronic device. The electronic device 201 is, in at least some embodiments, configured to identify a direction of a swipe gesture. For example, the electronic device 201 may determine whether the swipe gesture is in a first direction 101 (e.g. left to right) or a second direction 103 (e.g. right to left). Techniques for identifying the type of air gesture that is performed will be discussed in greater detail below.

In the embodiment of FIG. 1, the electronic device 201 is a smartphone. A smartphone is a mobile phone which offers more advanced computing capability than a basic non-smart cellular phone. For example, a smartphone may have the ability to run third party applications which are stored on the smartphone.

In other embodiments, the electronic device 201 may be a tablet computer. A tablet computer (which may also be referred to as a tablet) is an electronic device which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

The electronic device 201 may, in other embodiments, be of another type. For example, in some embodiments, the electronic device may be a remote control, such as a television remote control, a navigation system, such as a Global Positioning System, a wearable computer, such as a watch, a personal digital assistant (PDA), a desktop, netbook, notebook or laptop style computer system, or a television.

Furthermore, in at least some embodiments, the electronic device 201 may be a gesture companion device. A gesture companion device is an electronic device 201 which acts as a peripheral for another electronic device. More particularly, the gesture companion device may be an input device which may be used for receiving contactless input. Where the electronic device 201 is a gesture companion device, the contactless input may be used, for example, by another electronic device (which may be referred to as a primary electronic device). The primary electronic device may, for example, be a smartphone, tablet computer, television, navigation system, PDA, desktop, netbook, notebook or laptop style computer system, or an electronic device of a different type. The gesture companion device may be used for receiving contactless input, but the contactless input may control the primary electronic device. That is, the primary electronic device may perform a function based on contactless input received at the gesture companion device.

The electronic device 201 may, in other embodiments, be of a type not specifically listed herein.

In the embodiment of FIG. 1, the electronic device 201 includes a display 204. The display is disposed to be viewable from a front side 104 of the electronic device 201. The front side 104 of the electronic device 201 may include other features that are not illustrated in FIG. 1 such as, for example, one or more input interfaces (such as a button, keyboard, etc.), one or more cameras, etc.

In the embodiment illustrated, the electronic device 201 is oriented in a portrait orientation in which it height is longer than its width. It will, however, be appreciated that the techniques described herein may also be used when the electronic device 201 is oriented in a different orientation. For example, an air gesture may also be identified when the electronic device is oriented in a landscape orientation in which its width is longer than its height.

Components of the electronic device are housed within a housing 106. As illustrated, the housing frames the display 204. That is, the housing has an opening through which the display is exposed so that it is viewable by a user. The housing is, in at least some embodiments, constructed primarily of an opaque material which serves to prevent internal components of the electronic device 201 from being viewed by a user and which also assists in directing external light (i.e. light that is outside the housing) towards light-sensitive internal components such as, for example, the gesture sensor 261 and, in at least some embodiments, a camera.

To allow external light to travel from outside the electronic device 201 to the light-sensitive gesture sensor 261 housed within the electronic device 201 and/or to allow external light to travel from inside the electronic device 201 to outside the electronic device 201, the housing includes one or more windows 108 aligned with the gesture sensor 261. The window 108 may be a transparent portion of the housing 106. In the example illustrated, two windows 108 are illustrated. A first window 108a is aligned with a sensing element 150 of the gesture sensor 261 and a second window 108b is aligned with a light source 152 of the sensing element 150.

Referring now to FIG. 2, a cross section of the electronic device 201 is illustrated which further illustrates components of the gesture sensor 261. As shown, the housing 106 houses at least some components of the gesture sensor 261. For example, the housing 106 houses a light source 152 and a sensing element 150 associated with the gesture sensor 261.

The light source 152 and the sensing element 150 cooperate to provide a time of flight sensor 160. That is, the gesture sensor 261 includes a time of flight sensor 160 which includes both the sensing element 150 and the light source 152.

The time of flight sensor 160 can be configured to emit and receive light. The light is emitted by the light source 152 and is received (after being reflected by a nearby object such as a hand 110) at the sensing element 150. The time between the emission of light and the reception of the reflected light can be accurately measured by the time of flight sensor 160. For example, a processor 240 (FIG. 13) (which is coupled to the time of flight sensor), or another associated microprocessor, determines the amount of time that lapsed between the emission and reception of the laser light. This amount of time, along with the speed of the emitted light, is then used by the processor to determine the approximate distance of the object off of which the light reflected. In other words, the processor calculates the estimated proximity of the object to the time of flight sensor.

Accordingly, the gesture sensor 261 (which includes the time of flight sensor 160) operates by monitoring reflected light. That is, a light source 152 is periodically triggered (e.g. by a processor 240 or another timing component). That is, a burst of light is emitted by the light source. The gesture sensor 261 also monitors for the amount of light that is received back at the sensing element 150 of the time of flight sensor 160. The sensing element 150 is light-sensitive. That is, the sensing element 150 may generate one or more electric signals responsive to received light. The electric signal indicates the amount of light received at the sensing element 150. In at least some embodiments, the electric signal represents a return signal rate of received light. The return signal rate is a measure of the speed at which light emitted by the light source 152 is received (after being reflected) at the sensing element 150. For example, it may indicate the number of times the signal sensor detects light per unit time (e.g. the number of times a photon is detected and triggers the sensing element per second). A higher return signal rate in a serial measurement generally indicates a closer object. In at least some embodiments, the return signal rate may be output from the gesture sensor 261 in MHz.

In at least some embodiments, the time of flight sensor 160 is a single photon avalanche diode sensor (SPAD). This form of sensor is triggered when a photon hits it. That is, when a photon contacts the sensing element of the time of flight sensor 160, the sensor outputs a pulse.

To permit the time of flight sensor to both emit light externally and to receive light which was reflected by an external object, the time of flight sensor is aligned with the one or more windows 108. For example, a first window 108a may be aligned with the sensing element 150 and the second window 108b may be aligned with the light source 152.

The sensing element 150 includes a light-sensitive side, which may be referred to as a sensing side 170, and a non-sensing side 173 which is opposite the sensing side 170. The non-sensing side 173 may, in at least some embodiments, include one or more contacts or connectors which allow the sensing element 150 to be connected to another component of the gesture sensor 261 and/or electronic device 201 such as, for example, a printed circuit board (PCB). The sensing side 170 is sensitive to light (e.g. an electrical signal is generated based on light received at the sensing side 170) and is, therefore, proximate a window 108. That is, the sensing side 170 is nearer the first window 108a than is the non-sensing side 173.

As noted previously, the light source 152 is configured to emit a burst of light. In some embodiments, the light source 152 may be a light emitting diode (LED) or a laser. In at least some embodiments, the light source 152 may emit infrared (IR) light. In such embodiments, the light source 152 may be referred to as an infrared spectrum light source. As noted above, the light source 152 may be controlled by a controller associated with the electronic device 201 and/or the gesture sensor 261 such as, for example, a processor, microprocessor, or a timing component (e.g. a clock). In such embodiments, the light source 152 may emit the burst of light only when it is triggered by the controller. The emission of light by the light source 152 may be periodic.

The gesture sensor 261 also includes a barrier 180 disposed within the housing 106 between the light source 152 and the sensing element 150. The barrier 180 extends from the bottom of the housing to the top of the housing in the example illustrated. The barrier 180 is opaque and prevents or inhibits light from travelling internally from the light source 152 to the sensing element 150. That is, the barrier ensures that the light received at the sensing element 150 has traveled through a path that includes a portion which is external to the housing and that the light has not simply traveled internally from the light source 152 to the sensing element 150.

The time of flight sensor, in at least some embodiments, includes at least two signal outputs. More particularly, in at least some embodiments, the time of flight sensor outputs an electrical signal which indicates proximity of an object (such as a hand 110) to the sensing element 150. For example, a distance between the object and the sensing element may be represented in an electrical signal output by the time of flight sensor. The time of flight sensor may also output an electrical signal which represents a signal strength (and/or late of return) of the received light at the sensing element 150. One or more of these outputs may be provided to a processor 240 for further analysis. More particularly, as discussed below, a processor 240 may be configured to recognize an air gesture based on one or both of these electrical signals.

In the embodiment of FIG. 2, the electronic device 201 includes a single time of flight sensor 160. From the description which follows, it will be appreciated that the electronic device 201 may be able to detect gestures using this single time of flight sensor 160. That is, in at least some embodiments, a second time of flight sensor 160 is not required to allow for the gesture recognition. As will be discussed below, gesture recognition may be accomplished by creating differing optical characteristics on different sides of the sensing element 150. For example, a first side 190 of the sensing element 150 may have a greater viewing angle than a second side 192 of the sensing element. The first side 190 of the sensing element 150 is, in some embodiments, a side of the sensing element 150 which is nearest a first device side 171 of the electronic device 201. Similarly, the second side 192 of the sensing element is, in some embodiments, a side of the sensing element 150 which is nearest a second device side 172 of the electronic device 201. In the example illustrated, the first side 190 and the second side 192 are opposing sides of the sensing element 150 and the first side 190 is left of the second side 192 and may, therefore, be referred to as a left side and the second side 192 may be referred to as a right side. In other embodiments, this notation may be reversed; the first side may be a right side and the second side may be a left side. In yet other embodiments, the first side 190 may be a top side and the second side a bottom side or, conversely, the first side 190 may be a bottom side and the second side 192 a top side.

The viewing angle for a first side 190 of the sensing element 150 may be referred to as a first viewing angle 187 and may be defined as the angle between a center line 196, which is generally perpendicular to the sensing element 150, and a first side extreme line 197. The first side extreme line 197 represents a path near the first side 190 of the sensing element 150 that is furthest from the center line but which still permits light to be received at the sensing element 150. That is, light travelling along the first side extreme line 197 towards the sensing element 150 would be received at the sensing element, but light travelling along a path that is angled beyond the first side extreme line 197 would not be received at the sensing element 150.

Similarly, the viewing angle for a second side 192 of the sensing element 150 may be referred to as a second viewing angle 189 and may be defined as the angle between a center line 196, which is generally perpendicular to the sensing element 150, and a second side extreme line 199. The second side extreme line 199 represents a path near the second side 192 of the sensing element 150 that is furthest from the center axis but which still permits light to be received at the sensing element 150. That is, light travelling along the second side extreme line 199 towards the sensing element 150 would be received at the sensing element 150, but light travelling along a path that is angled beyond the second side extreme line 199 would not be received at the sensing element 150.

The center line 196 may be viewed in greater detail in FIGS. 3, 4 and 5 which will be discussed below. The center line 196 generally segments the sensing element 150 into two equal halves. The center line 196 may be referred to herein as a first center line to distinguish between another center line, which may be referred to as a second center line, which is discussed below with reference to FIG. 9. The second center line is perpendicular to the first center line.

As noted above, in at least some embodiments, a greater viewing angle may be provided to the sensing element 150 on one of the sides 190, 192 (as compared with the other of the sides). For example, the first viewing angle 187 may be larger than the second viewing angle 189. These differing viewing angles may, in at least some embodiments, be used for gesture detection. More particularly, these differing viewing angles may allow the gesture sensor 261 (and/or the electronic device 201) to distinguish between a swipe in a first direction 101 and a swipe in a second direction 103.

In the example illustrated, both the swipe in the first direction 101 and the swipe in the second direction 103 are performed after an object performing the gesture (e.g. a hand 110) is in a position where it is away from the electronic device and where it does not reflect light generated by the light source 152 back to the sensing element 150. For example, the object may initially be in a position (not shown) where it is to one side of the electronic device 201. Then, the object travels in a motion which is generally parallel to the front side 104 of the electronic device 201 to a position where it reflects light that is emitted by the light source 152 back to the sensing element 150 (e.g. the position shown in FIG. 2). Then, the object continues beyond the position where it reflects the light emitted by the light source 152 back to the sensing element 150 and ends in a position where it once again does not reflect light emitted by the light source 152 back to the sensing element 150. The swipe in the first direction 101 is generally characterized by movement of the object (e.g. the hand 110) from the first side 190 of the sensing element 150 (and the first device side 171 of the electronic device 201, in at least some embodiments) to the second side 192 of the sensing element 150 (and the second device side 172 of the electronic device, in some embodiments). In contrast, the swipe in the second direction 103 is generally characterized by movement from the second side 192 of the sensing element 150 (and the second device side 172 of the electronic device 201, in at least some embodiments) to the first side 190 of the sensing element 150 (and the first device side 171 of the electronic device, in some embodiments).

In at least some embodiments, the gesture sensor 261 (and/or the electronic device 201) may include one or more light inhibitors 145. The light inhibitor 145 functions to inhibit, block, modify and/or obstruct light which would otherwise travel from outside the electronic device 201 (i.e. from a position external to the housing 106), through the first window 108a of the housing, to the sensing element 150 at the sensing side 170. More particularly, in at least some embodiments, the light inhibitor 145 creates an asymmetric field of view for the sensing element 150. That is, the light inhibitor 145 causes the first side 190 of the sensing element 150 and the second side 192 of the sensing element 150 to both have different optical characteristics. For example, in at least some embodiments, the light inhibitor 145 causes the first side 190 and the second side 192 to both be associated with different viewing angles. For example, the light inhibitor 145 may cause the first side to be associated with a first viewing angle 187 which is larger than a second viewing angle 189 associated with a second side. That is, the light inhibitor(s) 145 may be oriented to provide a greater viewing angle for the sensing element 150 at the first side 190 as compared with the second side 192.

Since the light inhibitor(s) 145 are positioned to interfere with light which would otherwise enter the sensing element 150 via the sensing side 170, the light inhibitor(s) 145 are positioned relatively nearer the sensing side 170 of the sensing element than the non-sensing side 173. That is, the light inhibitor(s) are closer to the sensing side 170 than to the non-sensing side 173.

Furthermore, to allow the first side 190 and the second side 192 of the sensing element 150 to be associated with different optical characteristics, the light inhibitor(s) 145 are asymmetric with respect to the sensing element 150. More particularly, the light inhibitor(s) 145 may be asymmetric about a first center line 196 of the sensing element 150. The first center line 196 is a line which is located midway between the first side 190 and the second side 192 of the sensing element 150. Thus, the light inhibitor(s) create different optical characteristics on the first side 190 as compared with the second side 192. That is, the swipe in the first direction 101 may have different optical characteristics than a swipe in the second direction 103 due to the asymmetric nature the light inhibitor(s) 145.

A processor 240 coupled to the time of flight sensor 160 may be configured to identify gestures based on the differing optical characteristics associated with various sides of the sensing element 150 that are caused, at least in part, by the light inhibitors 145. For example, the processor 240 may be configured to determine that a swipe gesture in the first direction 101 has been performed when an electrical signal generated by the sensing element 150 represents one or more predetermined characteristics associated with the swipe in the first direction 101. As noted above, the swipe gesture in the first direction is characterized by movement of a subject from the first side 190 of the sensing element towards the second side 192 of the sensing element 150. The one or more predetermined characteristics that may be used to detect a swipe in the first direction may be characteristics that are associated with a portion of the light inhibitor(s) 145 located relatively closer to the first side of the sensing element than the second side of the sensing element. That is, the swipe gesture in the first direction 101 may be detected based on optical characteristics caused by a portion of a light inhibitor 145 that is near the first side 190 of the sensing element 150 (e.g. the portion causing the optical characteristics which cause a swipe in the first direction to be detected is adjacent to the first side and/or is nearer the first side than the second side).

Similarly, the processor 240 may be configured to determine that a swipe gesture in a second direction 103 has been performed when the electrical signal generated by the sensing element 150 represents one or more predetermined characteristics associated with the swipe gesture in the second direction 103. As noted above, the swipe gesture in the second direction is characterized by movement of a subject from the second side of the sensing element towards the first side of the sensing element. The one or more predetermined characteristics associated with the swipe in the second direction include characteristics associated with a portion of the light inhibitors located relatively closer to the second side of the sensing element than the first side of the sensing element. That is, the swipe gesture in the second direction 103 may be detected based on optical characteristics caused by a portion of a light inhibitor 145 that near the second side 192 of the sensing element (e.g. the portion causing the optical characteristics which cause a swipe in the second direction to be detected is adjacent to the second side and/or is nearer the second side than the second first).

Thus, in at least some embodiments, the processor 240 is configured to distinguish between a swipe in the first direction 101 and a swipe in the second direction 103 using information about the orientation of the one or more light inhibitors 145.

As will be discussed in greater detail below with reference to FIGS. 10 and 11, in some embodiments, the processor 240 may compare features of a leading edge of a gesture curve and a trailing edge of a gesture curve in order to determine whether a swipe gesture in the first direction 101 and/or a swipe gesture 103 in a second direction 103 has been performed. The gesture curve is a curve which is generated based on an electrical signal obtained from the sensing element 150. More particularly, the gesture curve is generated based on a return signal rate observed at the sensing element. The leading edge is the portion of the curve that is attributable to the movement of the detected object from a position where it does not reflect light generated by the light source back to the sensing element to a position where it is adjacent to the sensing element and reflects light back to the sensing element. The leading edge has a positive slope. The trailing edge is the portion of the curve that is attributable to the movement of the object from a position where it is adjacent to the sensing element and where it reflects light back to the sensing element to a position where it is does not reflect light generated by the light source back to the sensing element. The trailing edge has a negative slope.

In at least some embodiments, the direction of a swipe gesture may be determined based on the leading edge and trailing edge of a gesture curve obtained from the electrical signal. For example, the slopes of the leading edge and the trailing edge may be compared. In some embodiments, this comparison may be based on the absolute value of each of these slopes. Since the sides of the sensing elements may be associated with different viewing angles, the direction of a swipe may be determined based on this comparison. For example, the processor 240 may make an assumption that an object performing a gesture travels at approximately the same speed as it passes between the first side and second side of the sensing element. With this assumption in mind, the return signal rate obtained from the sensing element 150 should have a lower rate of change for the side associated with the greater viewing angle. Thus, if the leading edge has a lower rate of change than the trailing edge, then the processor may determine that the swipe was from the side of the sensing element with the larger viewing angle (e.g. the first side) to the side of the sensing element with the smaller viewing angle (e.g. the second side).

It will be appreciated that the gesture curve analysis discussed above may be performed without producing or plotting the gesture curve itself. That is, the information about the leading edge and trailing edge that is used to determine the direction of the swipe may be obtained from raw data without plotting the data as a gesture curve.

In some embodiments, the ratio of the slope of the leading edge curve to the slope of the trailing edge curve (or vice versa) could be determined and used to identify a gesture. By way of example, the ratio for a swipe in the first direction may, in some embodiments, be generally the inverse of the ratio for a swipe in an opposite direction (i.e. the second direction). Thus, the ratio would permit the processor to determine whether a swipe in a first direction or a swipe in a second direction (which is opposite the first direction) has been performed.

In at least some embodiments, the processor may be configured to also recognize a swipe in another direction, apart from the first and second direction. For example, a swipe in a third direction, which is perpendicular to the first and second directions, may be detected. Similarly, a swipe in a fourth direction, which is perpendicular to the first and second directions and which is opposite the swipe in the third direction, may be detected in some embodiments. To permit the swipe in the third and fourth directions to be detected, in some embodiments, the light inhibitor(s) 145 may be arranged to be asymmetric across a second center line that is midway between third and fourth sides of the sensing element 150. The light inhibitor(s) may be arranged such that each swipe is associated with different optical characteristics. For example, the ratio of the slope of the leading edge and the slope of the trailing edge of the gesture curve for a swipe in the third direction may be different than the ratio of the slope of the leading edge and the slope of the trailing edge of the gesture curve for a swipe in the other of the directions. Similarly, the ratio of the slope of the leading edge and the slope of the trailing edge of the gesture curve for a swipe in the fourth direction may be different than the ratio of the slope of the leading edge and the slope of the trailing edge of the gesture curve for a swipe in the other of the directions.

Figure 9:
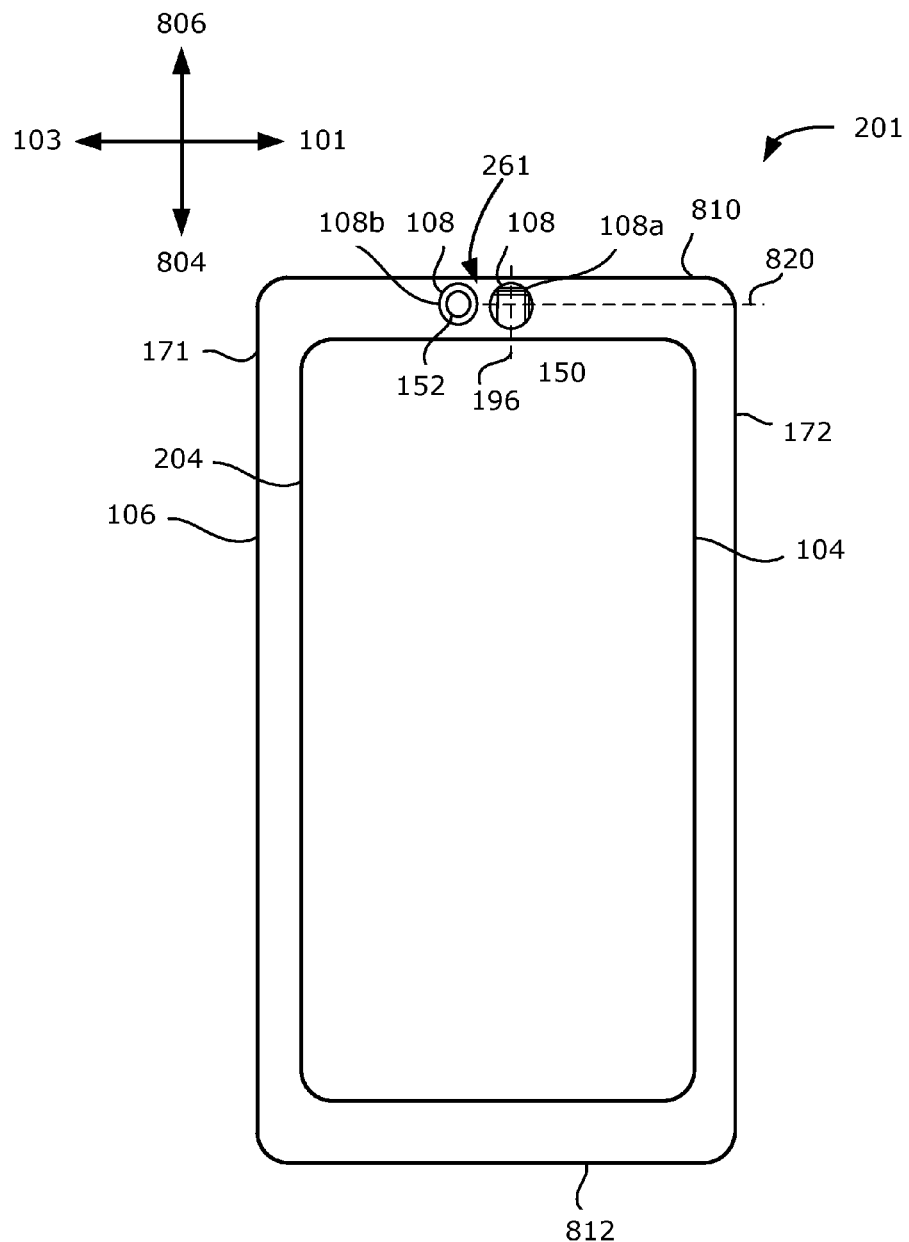
FIG. 9 is a top view of a further example electronic device having a gesture sensor in accordance with example embodiments of the present disclosure.

An example light inhibitor 145 arrangement which may be used to detect swipe in four directions is illustrated in FIG. 9 and will be discussed in greater detail below in the detailed discussion of FIG. 9.

The light inhibitor(s) 145 may take different forms in different embodiments. Generally, the light inhibitor(s) 145 are constructed of a material or design which inhibits light. In some embodiments, the light inhibitor(s) 145 may block, interfere with, attenuate, or otherwise affect light so that at least some light that is emitted by the light source 152 and reflected by a nearby object (such as a hand 110) which would otherwise travel unobstructed to the sensing element 150 is affected (e.g. is blocked from reaching the sensing element 150, interfered with before reaching the sensing element 150, attenuated before reaching the sensing element 150, etc.).

Since light that is emitted by the light source 152 and reflected by an external object may, in at least some embodiments, travel through a number of different components before reaching the sensing element 150, the light inhibitor(s) may be located at different layers of the electronic device 201. For example, in at least some embodiments, light that is being reflected by an external object towards the sensing element 150 may travel through one or more windows 108 associated with the electronic device's housing 106. Thus, in at least some embodiments, the light inhibitor(s) 145 may be provided on or by the window 108. One such embodiment will be discussed in greater detail below with reference to FIG. 8.

Similarly, in some embodiments, light that is being reflected by an external object towards the sensing element 150 may travel through a light guide which is layered between the sensing element 150 and the housing 106. Thus, in some embodiments, one or more of the light inhibitor(s) 145 may be provided on or by the light guide. One such embodiment will be discussed in greater detail below with reference to FIGS. 6 and 7.

Since the light being reflected by the external object towards the sensing element 150 must reach the sensing element 150 in order to be sensed, in some embodiments, the light inhibitor(s) may be applied to the sensing element itself. For example, the light inhibitor may be an opaque mask or layer applied to the sensing side 170 of the sensing element 150. That is, the light inhibitor may be disposed on a sensor window 302 (FIG. 3) associated with the sensing element. The sensor window may be the sensing side of the sensing element and is generally transparent to allow light to be received with the sensitive portions of the sensing element.

Figure 3:
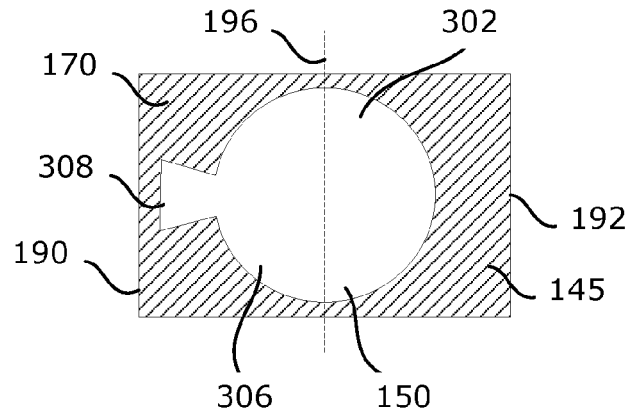
FIG. 3 is a top view of a gesture sensor having a light inhibitor in accordance with example embodiments of the present disclosure, the gesture sensor being shown as taken along line 3-3 of FIG. 2.

Referring now to FIG. 3, an example of a light inhibitor 145 which is applied to the sensing element is illustrated. FIG. 3 illustrates a top view of the sensing element 150 and is generally taken from the perspective of 3-3 of FIG. 2.

As noted above, the light inhibitor 145 may be applied to a sensor window 302 associated with the sensing element 150. The sensor window 302 is generally at the sensing side 170 of the sensing element 150. The light inhibitor 145 is opaque and may, for example, take the form of an opaque mask, which may be applied to the sensing element with an adhesive.

The light inhibitor 145 of FIG. 3 defines an opening through which light may be transmitted to the sensing element 150. In the example illustrated, the light inhibitor 145 defines an opening which is generally circular (i.e. which has a circular portion 306) and which has a protrusion 308 at one side which further extends the opening beyond the circle to increase the viewing angle at that side. As noted above, the light inhibitor 145 is asymmetric about a first center line 196 of the sensing element 150. As also noted above, the center line 196 is located midway between a first side 190 and a second side 192 of the sensing element 150.

In the example illustrated, the protrusion 308 extends from the circular portion 306 in the direction of the first side 190 of the sensing element 150, thereby increasing the viewing angle for the sensing element at the first side 190. The protrusion 308 takes the form of a triangle having its apex within the circular portion 306. Thus, the protrusion 308 is, in the example illustrated, a portion of a triangle.

It will be understood that the specific shape and arrangement of the light inhibitor 145 may differ in some embodiments from that shown in FIG. 3. For example, referring now to FIG. 4, a further example of a light inhibitor 145 which is applied to a sensor window is illustrated. The light inhibitor 145 of FIG. 4 is similar to that of FIG. 3. However, as illustrated in FIG. 4, the protrusion 408 of the light inhibitor 145 of FIG. 4 differs from the protrusion 308 of the light inhibitor of FIG. 3. In FIG. 4, the protrusion is generally rectangular in shape.

Figure 5:
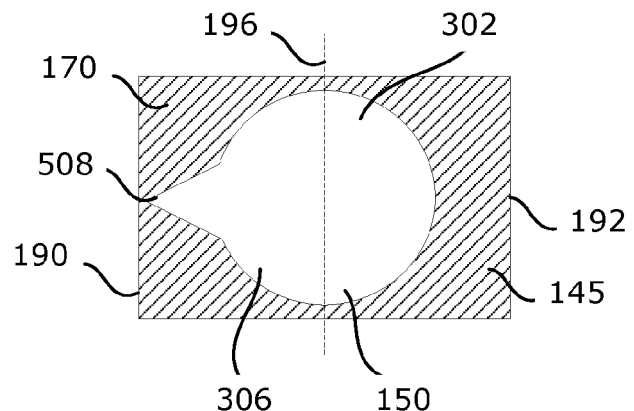
FIG. 5 is a top view of a further embodiment of a gesture sensor having a light inhibitor in accordance with example embodiments of the present disclosure, the gesture sensor being shown as taken along line 3-3 of FIG. 2.

By way of further example, referring now to FIG. 5, a further example of a light inhibitor 145 which is applied to a sensor window is illustrated. The light inhibitor 145 of FIG. 5 is similar to that of FIG. 3. However, as illustrated in FIG. 5, the protrusion 508 of the light inhibitor 145 of FIG. 5 differs from the protrusion 308 of the light inhibitor of FIG. 3. In FIG. 5, the protrusion is triangular in shape, but the apex of the triangle is not located within the circular portion. That is, the triangular protrusion 508 points away from the circular portion 306.

Figure 4:
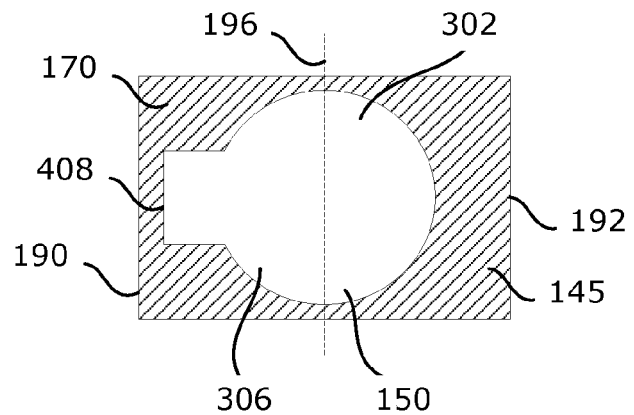
FIG. 4 is a top view of a further embodiment of a gesture sensor having a light inhibitor in accordance with example embodiments of the present disclosure, the gesture sensor being shown as taken along line 3-3 of FIG. 2.

It will be appreciated that the light inhibitor 145 that is applied to the sensor window 302 may take other forms apart from those illustrated in FIGS. 3 to 5.

Figure 6:
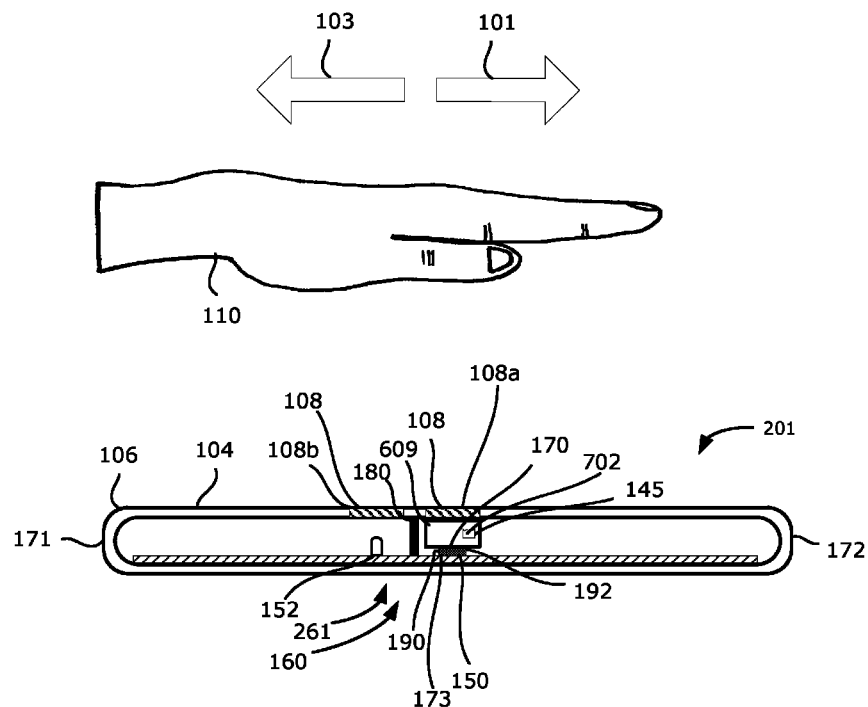
FIG. 6 is a cross-sectional view of a further embodiment of the example electronic device of FIG. 1 taken along line 2-2 of FIG. 1.

Referring now to FIG. 6, a further example of an electronic device having a light inhibitor 145 is illustrated. The electronic device 201 of FIG. 6 has features in common with the electronic device 201 of FIG. 2 and the discussion of these features will not be repeated. These features are identified with reference numerals that correspond to those in FIG. 2. Accordingly, the features discussed above with reference to FIGS. 1 and 2 may also be included in the electronic device of FIG. 6.

Figure 7:
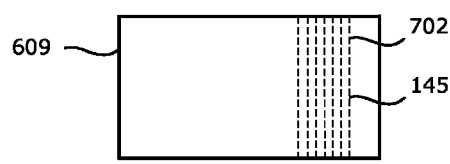
FIG. 7 is a top view of a light guide in accordance with example embodiments of the present disclosure.

In the electronic device 201 of FIG. 6, the light inhibitor 145 is provided in a light guide 609. The light guide 609 is layered between the sensing element 150 and the housing 106. More particularly, the light guide 609 is adjacent to the sensing side 170 of the sensing element 150 and is also adjacent to the window 108a of the housing 106 of the electronic device 201. The light guide functions to direct light which travels from outside the electronic device and through the window 108a of the housing, to the sensing side 170 of the sensing element. A top view of the light guide 609 is illustrated in FIG. 7.

The light guide 609 may, for example, be constructed of a clear material such as a clear plastic. In some such embodiments, the light guide 609 may be molded into a desired shape. In the embodiment of FIG. 6, the light inhibitor 145 is formed in the light guide 609. More particularly, in the example shown, the light inhibitor 145 is a prism pattern 702 that is formed in a portion of the light guide 609. More particularly, the light inhibitor 145 is a prism pattern 702 which is formed in a portion of the light guide 609. As discussed above with reference to FIG. 2, the light inhibitor 145 is asymmetric about a center line 196 of the sensing element 150. In at least some embodiments, this asymmetry may be created by including a prism pattern on one side of the center line but not on the other side of the center line. For example, the prism pattern may be formed in a portion of the light guide 609 that is relatively closer to the first side of the sensing element than the second side of the sensing element. That is, the prism pattern may be associated with the first side of the sensing element and the second side of the sensing element may not be associated with a corresponding prism pattern. As noted above in the discussion of FIG. 2, the light inhibitor 145 (i.e. the prism pattern in this example embodiment), is located in a position in which it will interfere with light which would otherwise pass without interference from the first window 108a of the housing 106 to the sensing element 150. Thus, the light inhibitor 145 (i.e. the prism pattern 702) is, in this example, position between the first window 108a and the sensing element 150. In the example illustrated in FIG. 7, the prism pattern 702 extends the width of the light guide 609.

The portion of the light guide 609 which includes the prism pattern directs light differently than other portions of the light guide 609. For example, the prism pattern may focus light in a way that is different than non-prism portions of the light guide. By affecting light in this way, the gesture curve for a swipe which begins at a side of the sensing element that is near the prism will differ from a gesture curve for a swipe which begins at a side of the sensing element that is away from the prism. That is, the prism has an optical characteristic which is identifiable on a gesture curve, allowing the processor 240 to determine whether a gesture began or ended at the side of the sensing element associated with the prism.

It will be appreciated that the asymmetry in the light guide may, in other embodiments (not shown) be created by having prism patterns in the light guide 609 on both sides of the center line. In such embodiments, the prism patterns may differ from one another (i.e. the prism pattern on one side of the center line may differ from the prism pattern on the other side of the center line) and/or the prism patterns may be at different distances from the center line.

Figure 8:
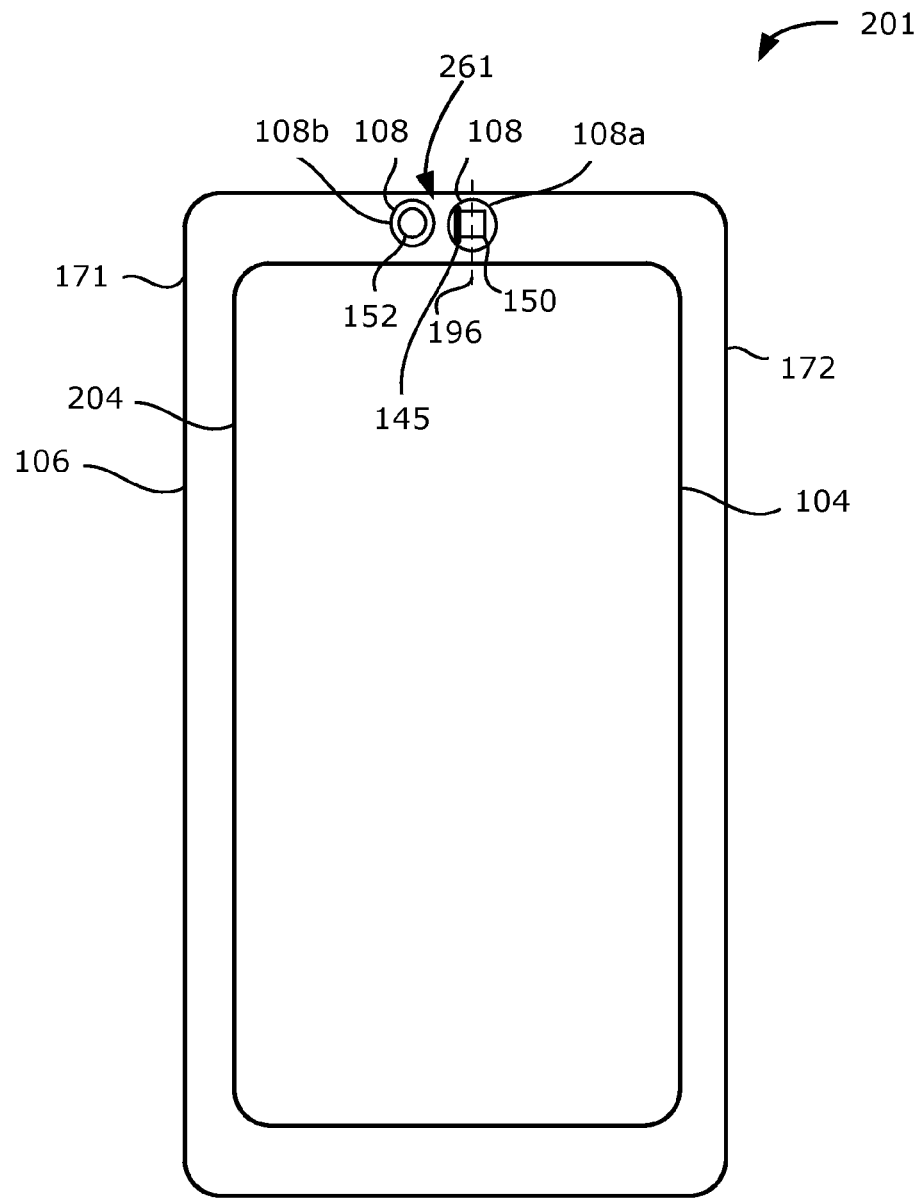
FIG. 8 is a top view of a further example electronic device having a gesture sensor in accordance with example embodiments of the present disclosure.

Referring now to FIG. 8, an example of a top view of a further embodiment of an electronic device 201 will now be described. The electronic device may have features described above with reference to FIGS. 1 and 2 and a cross section of the electronic device 201 of FIG. 8 may be the same or a modified version of what is shown in FIG. 2. In the embodiment of FIG. 8, however, the light inhibitor 145 (whose function is described with reference to FIG. 2) is provided on the housing 106. That is, the light inhibitor is provided on the housing 106 which houses components of the electronic device such as the time of flight sensor of FIG. 2. More particularly, the light inhibitor(s) 145 may be defined on a window 108 of the housing which allows light from outside the housing to be transferred to the sensing element 150, which is located within the housing 106. That is, the light inhibitor(s) 145 may be provided on a first window 108a of the housing 106 which is adjacent to the sensing element 150.

As illustrated in FIG. 8, in this embodiment, the light inhibitor(s) 145 may take the form of an opaque pattern. In the embodiment illustrated, this opaque pattern takes the form of an opaque line; however, the opaque pattern may be different in other embodiments. The opaque pattern may be provided, for example, as a mask or paint which may be applied to the window 108a.

As noted in the discussion above, the light inhibitor 145 is asymmetric about the center line 196 of the sensing element. The center line 196 bisects the sensing surface of the sensing element into two equal parts. This asymmetry may be created, for example, by including an opaque pattern on the window at one side of the center line 196 but not at the other side of the center line or, by having different opaque patterns on both sides of the center line 196. For example, one side may have a thin line and the other a thick line or multiple lines. Similarly, in some embodiments, the asymmetry may be created by having a common pattern on both sides of the center line, but by spacing these patterns at differing distances from the center line.

As noted above in the discussion of FIG. 2, in some embodiments, the light inhibitor(s) may be arranged to permit the electronic device 201 to recognize swipes in more than two directions. For example, in some embodiments, the light inhibitors may be configured to allow swipes in four directions to be recognized. Referring now to FIG. 9, an example of one such embodiment is illustrated.

The embodiment of FIG. 9 could be used to allow the processor to also recognize swipes in first, second, third and fourth directions. The swipe in the first direction 101 may be as described above with reference to FIG. 2.

In the example illustrated, the swipe in the first direction 101, the swipe in the second direction 103, the swipe in the third direction 804 and the swipe in the fourth direction 806 are performed after an object performing the gesture (e.g. a hand 110) is in a position where it is away from the electronic device and where it does not reflect light generated by the light source 152 back to the sensing element 150. For example, the object may initially be in a position where it is to one side of the electronic device 201. Then, the object travels in a motion which is generally parallel to the front side 104 of the electronic device 201 to a position where it reflects light that is emitted by the light source 152 back to the sensing element 150. Then, the object continues beyond the position where it reflects the light emitted by the light source 152 back to the sensing element 150 and ends in a position where it once again does not reflect light emitted by the light source 152 back to the sensing element 150.

The swipe in the first direction 101 is generally characterized by movement from the first side 190 of the sensing element 150 (and the first device side 171 of the electronic device 201, in at least some embodiments) to the second side 192 of the sensing element 150 (and the second device side 172 of the electronic device, in some embodiments). In contrast, the swipe in the second direction 103 is generally characterized by movement from the second side 192 of the sensing element 150 (and the second device side 172 of the electronic device 201, in at least some embodiments) to the first side 190 of the sensing element 150 (and the first device side 171 of the electronic device, in some embodiments). The swipe in the third direction 804 and the swipe in the fourth direction 806 are perpendicular to the swipe in the first direction and the swipe in the second direction. The swipe in a fourth direction is in a direction which is opposite the swipe in the third direction. The swipe in the third direction 804 is characterized by a movement that is generally parallel to the device beginning at a point which is nearer a device third side 810 for the electronic device 201 and ending at a point which is relatively farther from the device third side 810 and is relatively nearer a device fourth side 812.

Similarly, a swipe in the fourth direction 806 is characterized by a movement that is generally parallel to the device beginning at a point which is nearer a device fourth side 812 for the electronic device 201 and ending at a point which is relatively farther from the device fourth side 812 and is relatively nearer a device third side 810.

To permit the swipe in the third and fourth directions to be detected, the light inhibitor(s) 145 may be arranged to be asymmetric across both a first center line 196 and a second center line 820 that is midway between a third side and fourth side of the sensing element 150. The light inhibitor(s) may be arranged such that each swipe is associated with different optical characteristics. That is the light inhibitor(s) provide different light inhibiting properties on each side of the sensing element 150. The first center line 196 and second center line 820 effectively divide the sensing element into quarters.

In the embodiment of FIG. 9, the light inhibitor(s) 145 include portions associated with first, second and third sides of the sensing element 150. That is, a portion of the light inhibitor(s) may be near a first side of the sensing element, another portion may be near a second side of the sensing element, and another portion may be near a third side of the sensing element. Optionally, in some embodiment, a further portion of the light inhibitors may be near a fourth side of the sensing element. The portions associated with each of the sides include differing features to provide optical characteristics unique to the respective sides. By way of example, in the embodiment illustrated the light inhibitor(s) are applied to the window 108a of the housing 106 in the manner described above with reference to FIG. 8. In this embodiment, the light inhibitor(s) 145 associated with each side is different. That is, a first pattern is applied to the portion of the window that is nearest the first device side 171, a second pattern is applied to the portion of the window that is nearest the second device side 172 and a third pattern is applied to the portion of the window that is nearest the device third side 810. Optionally, a fourth pattern may be applied to the portion of the window that is nearest the device fourth side 812. This fourth pattern is optional since the lack of a pattern may be used to create the optical characteristic that is unique to the fourth side. Each of the patterns are different, allowing the processor to determine whether a swipe in a first, second, third or fourth direction has been performed based on the optical characteristic(s) represented in the electrical signal which is output by the sensing element. That is, when a swipe is performed and the leading edge of the gesture curve for the swipe indicates an optical characteristic associated with a particular one of the sides, then the processor may determine that a swipe gesture which begins at that side has been performed.

Figure 10:
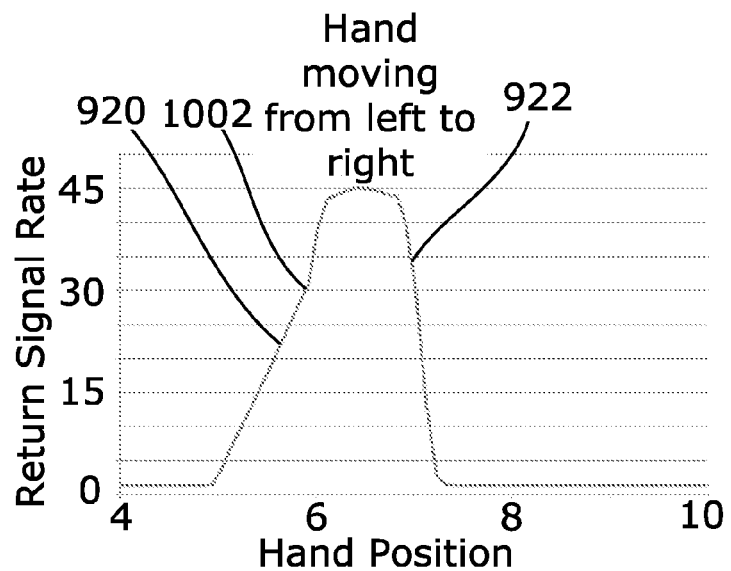
FIG. 10 represents an example electrical signal output from a gesture sensor when a swipe gesture in a first direction is performed in accordance with example embodiments of the present disclosure.
Figure 11:
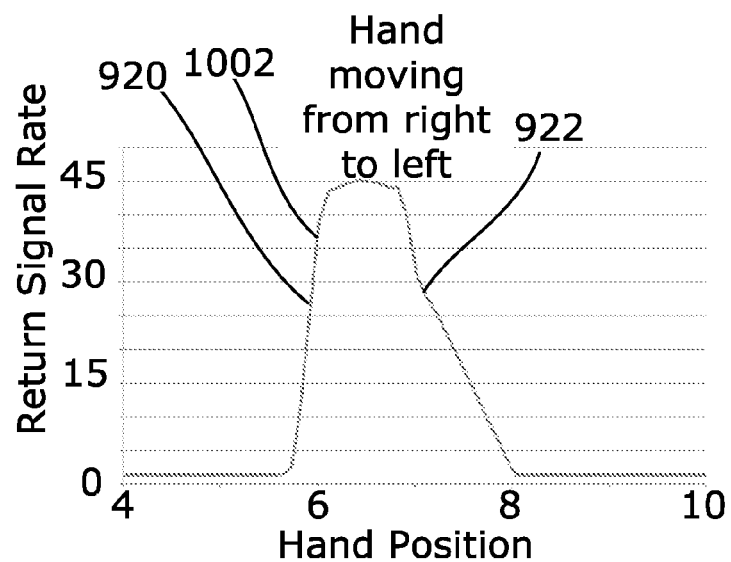
FIG. 11 represents an example electrical signal output from a gesture sensor when a swipe gesture in a second direction is performed in accordance with example embodiments of the present disclosure.

Referring now to FIGS. 10 and 11, example output from a sensing element 150 will now be discussed. FIG. 10 provides an example output for a swipe in a first direction 101 and FIG. 11 provides an example output for a swipe in the second direction 103. These outputs may generally be referred to as gesture curves and, for the clarity, the gesture curve of FIG. 10 will be referred to as a first gesture curve 902 and the gesture curve of FIG. 11 will be referred to as a second gesture curve 1002.

The gesture curves illustrated provide, on their y-axes, a return signal rate. The return signal rate is output by the sensing element 150 and is a measure of the speed at which light emitted by the light source 152 is received (after being reflected) at the sensing element 150. The x-axes of these curves are used to illustrate the position of an object (such as a hand).

Each curve includes a leading edge 920 and a trailing edge 922. The leading edge is the portion of the curve that is attributable to the movement of the detected object from a position where it does not reflect light generated by the light source back to the sensing element to a position where it is adjacent to the sensing element and reflects light back to the sensing element. The leading edge has a positive slope. The trailing edge is the portion of the curve that is attributable to the movement of the object from a position where it is adjacent to the sensing element and where it reflects light back to the sensing element to a position where it is does not reflect light generated by the light source back to the sensing element. The trailing edge has a negative slope.

Notably, the first gesture curve 902 and the second gesture curve 1002 differ. For example, the first gesture curve 902 has a leading edge which is steeper than its trailing edge. In contrast, the second gesture curve 1002 has a trailing edge which is steeper than its leading edge. This difference may, for example, be caused by a difference in the viewing angle for the sensing element at different sides of the electronic device. That is, an asymmetric viewing angle may create this difference in the gesture curves.

By analyzing one or both of the leading edge or the trailing edge of a gesture curve, the processor may identify a direction associated with a swipe gesture. For example, the slopes of the leading edge and the trailing edge may be compared.

Method of Detecting Swipe Gestures

Figure 12:
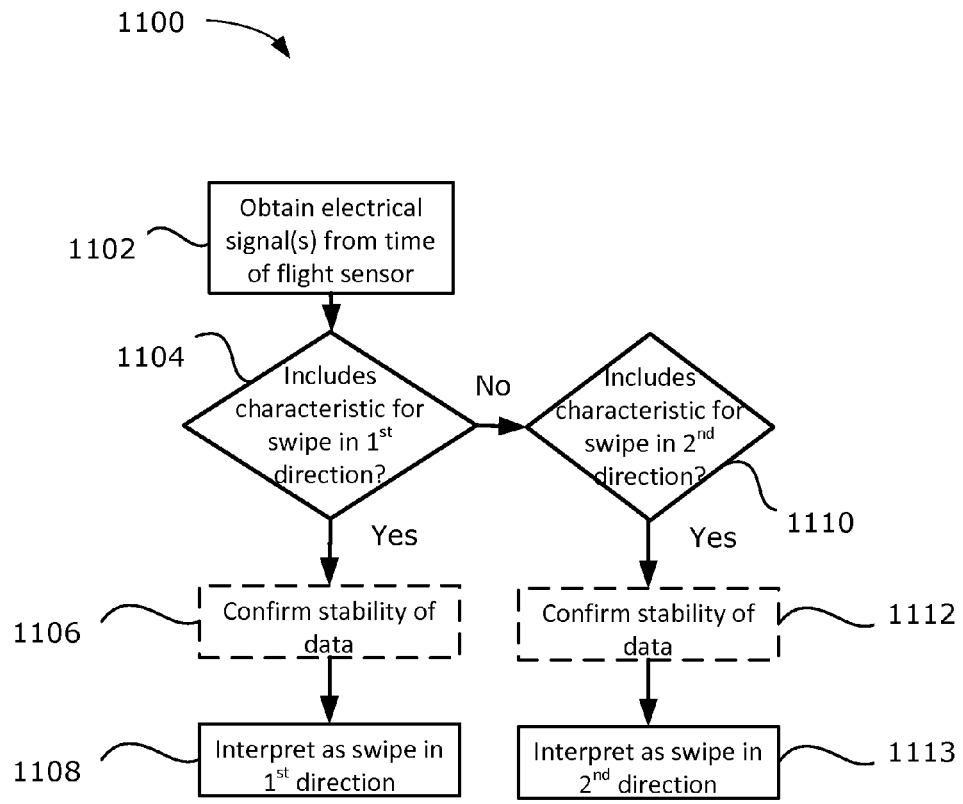
FIG. 12 is a flowchart of an example method of detecting a gesture in accordance with example embodiments of the present disclosure.

Referring now to FIG. 12, an example method 1100 for identifying a swipe gesture is illustrated in flowchart form. The method 1100 includes features which may be provided by an electronic device 201, such as the electronic device 201 of any one of FIGS. 1 to 11 and 13. More particularly, one or more application or module or processor-readable instructions associated with the electronic device 201, such as a contactless gesture interpretation module 297 (FIG. 13), may contain processor readable instructions for causing a processor associated with the electronic device 201 to perform one or more steps of the method 1100 of FIG. 1. That is, in at least some example embodiments, the electronic device 201 may be configured to perform the method 1100 of FIG. 12.

In at least some embodiments, one or more of the functions or features of the method 1100 of FIG. 12 may be performed, in whole or in part, by another system, software application, module, component or device apart from those specifically listed above.

In some embodiments, the method 1100 (or parts thereof) may be performed on a main processor 240 of the electronic device 201. In other embodiments, the method 1100 may be performed on a microprocessor or processor that is not the main processor of the electronic device. For example, in some embodiments, the gesture sensor 261 may be equipped with a microprocessor which may perform the method 1100.

At 1102, one or more electrical signals are obtained from a time of flight sensor. As noted in the discussion of FIGS. 1 and 2 above, in some embodiments, these electrical signals may include a signal rate of return. In some embodiments, one or more of these electrical signals indicate proximity of an object (such as a hand 110) to the sensing element 150 of the electronic device 201.

At 1104, the processor determines whether a swipe gesture in a first direction has been performed. As noted above, this determination may be based on the leading edge and trailing edge of a gesture curve defined in one or more of the electrical signals. More particularly, the processor may determine whether the electrical signal generated by the sensing element represents one or more predetermined characteristics associated with a swipe gesture in the first direction. If so, then the processor may determine that a swipe gesture in the first direction has, in fact, been performed. That is, at 1108, the processor may interpret the gesture as a swipe in the first direction.

If the swipe is not a swipe in the first direction, the processor may determine whether it is a swipe in the second direction. At 1110, the processor determines whether a swipe gesture in the second direction has been performed. This determination may also be based on the leading edge and trailing edge of a gesture curve defined in one or more of the electrical signals. More particularly, the processor may determine whether the electrical signal generated by the sensing element represents one or more predetermined characteristics associated with a swipe gesture in the second direction. If so, then the processor may determine that a swipe gesture in the first direction has, in fact, been performed. That is, at 1113, the processor may interpret the gesture as a swipe in the first direction.

Optionally, in some embodiments, before determining that a swipe in the first direction or a swipe in the second direction has been performed, the processor may confirm that the gesture curve was not caused by perpendicular movement. That is, the processor 240 may confirm that the electrical signal containing the gesture curve was not produced from movement of a hand perpendicularly towards (or away from) the electronic device 201. Accordingly, in at least some embodiments, at 1106 and 1112, before interpreting the gesture as a swipe in the first direction or a swipe in the second direction, the processor may determine, based on time of flight data from the time of flight sensor, that the electrical signal containing the gesture curve represents parallel movement of a subject with respect to the sensing element (as opposed to perpendicular movement). Thus, the electronic device may check the stability of the time of flight data to confirm that an object was moved generally parallel to the electronic device.

Example Electronic Device

Reference will now be made to FIG. 13 which illustrates an example electronic device 201. In the illustrated example embodiment, the electronic device 201 is a mobile communication device. In at least some example embodiments, the mobile communication device is a two-way communication device having data and possibly voice communication capabilities, and the capability to communicate with other computer systems; for example, via the internet. As noted above, the electronic device 201 may take other forms in other embodiments.

The electronic device 201 of FIG. 13 includes a housing (not shown in FIG. 13) which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 290 to perform communication functions. The processor 240 interacts with additional device subsystems including one or more input interfaces 206 (such as a keyboard, one or more control buttons, one or more microphones 258, a gesture sensor 261, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), one or more speakers 256, or other output interfaces 205), a short-range communication subsystem 262, and other device subsystems generally designated as 264. Some of the subsystems shown in FIG. 13 perform communication-related functions, whereas other subsystems may provide "resident" or on-device functions.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The electronic device 201 may communicate with any one of a plurality of fixed transceiver base stations of the wireless network 290 within its geographic coverage area using the communication subsystem 211. The electronic device 201 may send and receive communication signals over the wireless network 290 after the required network registration or activation procedures have been completed.

In some example embodiments, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 290. The data 227 may also include user application data such as email messages, address book and contact information, calendar and schedule information, notepad documents, image files, and other commonly stored user information stored on the electronic device 201 by its user, and other data.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 290. The alternate download path may for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 290 is automatically routed to the electronic device 201 using the USB cable or Bluetooth® connection. Similarly, any traffic destined for the wireless network 290 is automatically sent over the USB cable Bluetooth® connection to the host computer for processing.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

The electronic device 201 includes a gesture sensor 261, which may be of the type described above. For example, the gesture sensor may be a time of flight sensor which includes a sensing element 150 and a light source 152.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 290, the auxiliary I/O subsystem 250, the data port 252, the short-range communication subsystem 262, or other suitable device subsystems 264. The downloaded programs or code modules may be permanently installed; for example, written into the program memory (e.g. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 290.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220 stored in memory such as persistent memory; for example, in the flash memory 244. As illustrated in FIG. 13, the software modules 220 may include operating system software 222 and one or more additional applications 224 or modules such as, for example, a gesture interpretation module 297. In the example embodiment of FIG. 13, the gesture interpretation module 297 is illustrated as being implemented as a stand-alone application 224, but in other example embodiments, the gesture interpretation module 297 could be implemented as part of the operating system 222 or another application 224. Furthermore, as noted above, in at least some embodiments, the gesture interpretation module 297 could be implemented as software or hardware included in a processor or microprocessor that is not the main processor 240. For example, the gesture sensor 261 may, in some embodiments, include a processor which may be configured to perform one or more of the functions of the gesture interpretation module 297.

The gesture interpretation module 297 is configured to determined, based on light received at the sensing element 150, whether a predetermined gesture has occurred. The predetermined gesture may, for example, be a contactless gesture which does not require contact with the electronic device 201. That is, the predetermined gesture may be a gesture which is performed in space. Example methods for determining whether a predetermined gesture has been discussed above and the gesture interpretation module 297 may be configured to perform one or more of these methods. For example, the method 1100 of FIG. 12 may be performed by a processor which executes the gesture interpretation module 297.

The electronic device 201 may include a range of additional software applications 224, including, for example, a notepad application, voice communication (i.e. telephony) application, mapping application, a media player application, or any combination thereof. Each of the software applications 224 may include layout information defining the placement of particular fields and graphic elements (e.g. text fields, input fields, icons, etc.) in the user interface (i.e. the display 204) according to the application.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

While the present application includes some descriptions of methods, a person of ordinary skill in the art will understand that the present application is also directed to various apparatus such as a handheld electronic device and a server. The handheld electronic device and the server include components for performing at least some of the example aspects and features of the described methods, be it by way of hardware components (such as the memory and/or the processor), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A gesture sensor comprising:
    a time of flight sensor having a sensing element configured to generate an electrical signal responsive to received light, and a light source for emitting a burst of light, the sensing element having a sensing side for receiving light and a non-sensing side which is opposite the sensing side;
    one or more light inhibitors positioned relatively nearer the sensing side of the sensing element than the non-sensing side, the one or more light inhibitors asymmetric about a first center line of the sensing element, the first center line located midway between first and second sides of the sensing element, wherein the one or more light inhibitors provide optical characteristics unique to the respective sides of the sensing element; and
    a processor coupled to the time of flight sensor, the processor being configured to determine that a swipe gesture in a first direction has been performed based on identifying one or more of the optical characteristics in the electrical signal, the swipe gesture in the first direction being characterized by movement of a subject from the first side of the sensing element towards the second side of the sensing element.

2. The gesture sensor of claim 1, wherein the processor is further configured to:
    determine that a swipe gesture in a second direction has been performed based on identifying one or more of the optical characteristics in the electrical signal, the swipe gesture in the second direction being characterized by movement of a subject from the second side of the sensing element towards the first side of the sensing element.

3. The gesture sensor of claim 1, wherein the processor is configured to distinguish between a swipe in the first direction and a swipe in the second direction using information about the orientation of the one or more light inhibitors.

4. The gesture sensor of claim 1 further comprising:
    a light guide, the light guide being positioned adjacent to the sensing element,
    and wherein the one or more light inhibitors are formed in the light guide.

5. The gesture sensor of claim 4, wherein the one or more light inhibitors comprise a prism pattern formed in a portion of the light guide that is relatively closer to the first side of the sensing element than the second side of the sensing element.

6. The gesture sensor of claim 1, wherein the one or more light inhibitors are oriented to provide a greater viewing angle for the sensing element at the first side as compared with the second side and wherein identification of one or more of the optical characteristics in the electrical signal is based on a leading edge and a trailing edge of a gesture curve obtained from the electrical signal.

7. The gesture sensor of claim 6, wherein determining that a swipe in the first direction has been performed comprises comparing a slope of the leading edge of the gesture curve with a slope of the trailing edge of the gesture curve.

8. The gesture sensor of claim 6, wherein one or more of the light inhibitors are disposed on a sensor window associated with the sensing element.

9. The gesture sensor of claim 8, wherein the one or more light inhibitors define a generally circular opening having a protrusion at one side.

10. The gesture sensor of claim 1, wherein one or more of the light inhibitors are provided on a housing which houses components of an electronic device, and wherein the one or more light inhibitors are defined on a window of the housing which allows light from outside the housing to be transferred to the sensing element, the sensing element being located within the housing.

11. The gesture sensor of claim 10, wherein the one or more light inhibitors are comprised of an opaque pattern disposed on the window.

12. The gesture sensor of claim 1, wherein the processor is further configured to:
    determine, based on time of flight data from the time of flight sensor, that the electrical signal represents parallel movement of a subject with respect to the sensing element, the time of flight data providing a measure of the distance between the sensing element and an object reflecting the received light.

13. The gesture sensor of claim 1, wherein the one or more light inhibitors include portions associated with first, second and third sides of the sensing element, and wherein the portions associated with each of these sides include differing features to provide optical characteristics unique to the respective sides and wherein the processor is configured to determine whether the electrical signal represents a swipe in a first, second, third or fourth direction by identifying one or more of the optical characteristics in the electrical signal.

14. An electronic device comprising:
a processor;
a gesture sensor coupled with the processor, the gesture sensor comprising:
a time of flight sensor having a sensing element configured to generate an electrical signal responsive to received light and a light source for emitting a burst of light, the sensing element having a sensing side for receiving light and a non-sensing side which is opposite the sensing side; and
one or more light inhibitors positioned relatively nearer the sensing side of the sensing element than the non-sensing side, the one or more light inhibitors asymmetric about a first center line of the sensing element, the first center line located midway between first and second sides of the sensing element, wherein the one or more light inhibitors provide optical characteristics unique to the respective sides of the sensing element,
the processor being configured to determine that a swipe gesture in a first direction has been performed based on identifying one or more of the optical characteristics in the electrical signal, the swipe gesture in the first direction being characterized by movement of a subject from the first side of the sensing element towards the second side of the sensing element.

15. The electronic device of claim 14, wherein the processor is further configured to:
determine that a swipe gesture in a second direction has been performed based on identifying one or more of the optical characteristics in the electrical signal, the swipe gesture in the second direction being characterized by movement of a subject from the second side of the sensing element towards the first side of the sensing element.

16. The electronic device of claim 14, wherein the processor is configured to distinguish between a swipe in the first direction and a swipe in the second direction using information about the orientation of the one or more light inhibitors.

17. The electronic device of claim 14, further comprising:
a light guide, the light guide being positioned adjacent to the sensing element,
and wherein the one or more light inhibitors are formed in the light guide.

18. The electronic device of claim 17, wherein the one or more light inhibitors comprise a prism pattern formed in a portion of the light guide that is relatively closer to the first side of the sensing element than the second side of the sensing element.

19. The electronic device of claim 14, wherein the one or more light inhibitors are oriented to provide a greater viewing angle for the sensing element at the first side as compared with the second side and wherein identification of one or more of the optical characteristics in the electrical signal is based on a leading edge and a trailing edge of a gesture curve obtained from the electrical signal.

20. The electronic device of claim 19, wherein determining that a swipe in the first direction has been performed comprises comparing a slope of the leading edge of the gesture curve with a slope of the trailing edge of the gesture curve.

* * * * *